United States Patent
Lee et al.

(10) Patent No.: US 8,247,982 B2
(45) Date of Patent: Aug. 21, 2012

(54) METHOD OF DRIVING A LIGHT SOURCE, LIGHT SOURCE ASSEMBLY FOR PERFORMING THE METHOD, AND LIQUID CRYSTAL DISPLAY APPARATUS HAVING THE SAME

(75) Inventors: Jong-Jae Lee, Asan-si (KR);
Hyeon-Yong Jang, Osan-si (KR);
Ho-Young Kim, Cheonan-si (KR);
Hyung-Ku Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 745 days.

(21) Appl. No.: 12/362,939

(22) Filed: Jan. 30, 2009

(65) Prior Publication Data
US 2010/0176736 A1      Jul. 15, 2010

(30) Foreign Application Priority Data
Jan. 15, 2009  (KR) .................. 10-2009-0003254

(51) Int. Cl.
*H05B 37/00*  (2006.01)

(52) U.S. Cl. ................. 315/209 R; 315/224; 315/307

(58) Field of Classification Search .................. 315/224, 315/276, 307
See application file for complete search history.

(56) References Cited

U.S. PATENT DOCUMENTS

2008/0258645 A1*  10/2008  Han et al. ................. 315/257
2009/0185105 A1*  7/2009  Hasegawa ................. 349/61

* cited by examiner

*Primary Examiner* — Shawki S Ismail
*Assistant Examiner* — Jany Tran
(74) *Attorney, Agent, or Firm* — Cantor Colburn LLP

(57) ABSTRACT

A method of driving a light source includes; converting an externally supplied direct current voltage into a first alternating current voltage, boosting the first alternating current voltage to a second alternating current voltage having a higher voltage than the first alternating current voltage, turning on the light source using the second alternating current voltage, detecting an arc noise detection voltage by adding arc noise generated from a high voltage terminal of the light source and arc noise generated from a low voltage terminal of the light source, and blocking the high voltage from being provided to the light source based on the detected arc noise detection voltage.

17 Claims, 6 Drawing Sheets

METHOD OF DRIVING A LIGHT SOURCE, LIGHT SOURCE ASSEMBLY FOR PERFORMING THE METHOD, AND LIQUID CRYSTAL DISPLAY APPARATUS HAVING THE SAME

This application claims priority to Korean Patent Application No. 2009-003254, filed on Jan. 15, 2009, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a method of driving a light source, a light source assembly for performing the method, and a liquid crystal display ("LCD") apparatus having the light source assembly. More particularly, exemplary embodiments of the present invention relate to a method of driving a light source used in detecting small arc noise, a light source assembly for performing the method, and an LCD apparatus having the light source assembly.

2. Description of the Related Art

Generally, a display apparatus used as a monitor of a computer or a television ("TV") may be an organic light-emitting diode ("OLED") display, a vacuum fluorescent display ("VFD"), a field emission display ("FED"), a plasma display panel ("PDP") display, etc. all of which are capable of self-emitting light, or a liquid crystal display ("LCD") apparatus that is not capable of self-emitting light and requires a light source.

A typical LCD apparatus includes two substrates, each having an electrode generating electric field, and a liquid crystal layer interposed between the substrates and having dielectric anisotropy. The electrodes generate an electric field to be applied to the liquid crystal layer. The voltage of at least one of the electrodes generating electric field is changed to control the strength of the electric field, so that the LCD apparatus controls the transmissivity of light passing through the liquid crystal layer to display a desired image.

Here, the light applied to the LCD may be a separately equipped artificial light source or a natural light source.

A typical light source for the LCD apparatus, e.g. a backlight apparatus, uses a plurality of fluorescent lamps, such as cold cathode fluorescent lamps ("CCFLs") or external electrode fluorescent lamps ("EEFLs"), as a light source and includes an inverter driving the lamps. The inverter converts a direct current ("DC") voltage, input from an external device according to a voltage for controlling brightness, into an alternating current ("AC") voltage. An inverter controller equipped in the inverter applies the converted AC voltage to the lamps, lights the lamps and controls the brightness of the lamps. Also, the inverter controller senses a current flowing through the lamps and controls a voltage applied to the lamps based on the sensed current.

When a fluorescent lamp is used as a light source for the LCD apparatus, the inverter applies a high voltage to the lamp to initially turn on the light. However, when the insulation state of a terminal of the lamp to which the high voltage applied is poor, or when there is connection resistance between the terminal of the lamp and the terminal of the inverter, arc noise may be generated from an arc to have an adverse effect on the operation of a backlight apparatus, e.g., electrical arcing may occur between the terminal of the lamp and the terminal of the inverter or between either terminal and other components of the backlight apparatus. Also, the generated arc may damage the inverter. To prevent the generation of such an arc, during the manufacturing process an inspector inspects the connection state between a lamp electrode and a high voltage terminal one by one with the naked eye. This procedure complicates the manufacturing process and adds additional costs thereto. In addition, a situation in which the connection is deteriorated due to moving or usage of a product may still be generated even after inspection.

Accordingly, what is needed is an apparatus and method for stopping the operation of an inverter when arc noise is generated.

BRIEF SUMMARY OF THE INVENTION

Exemplary embodiments of the present invention provide a method of driving a light source capable of improving the reliability of driving by easily detecting small arc noises to reduce malfunctions.

Exemplary embodiments of the present invention also provide a light source assembly for performing the above-mentioned method.

Exemplary embodiments of the present invention also provide a liquid crystal display ("LCD") apparatus having the above-mentioned light source assembly.

According to one exemplary embodiment of the present invention, a method of driving a light source includes; converting an externally supplied direct current ("DC") voltage into a first alternating current ("AC") voltage, boosting the first AC voltage to a second AC voltage having a higher voltage than the first alternating current voltage, turning on the light source using the second AC voltage, detecting an arc noise detection voltage by adding arc noise generated from a high voltage terminal of the light source and arc noise generated from a low voltage terminal of the light source, and blocking the second alternating current voltage from being provided to the light source based on the detected arc noise detection voltage.

In one exemplary embodiment, detecting the arc noise detection voltage further includes; removing a low frequency component from a sine wave output from the light source to isolate the arc noise from the sine wave, half-wave rectifying the arc noise to block a positive component of the arc noise, and charging a first voltage of a negative component of the arc noise, half-wave rectifying the arc noise to block the negative component of the arc noise, and charging a second voltage of a positive component of the arc noise, and detecting an arc noise detection voltage by adding the first voltage and the second voltage.

In one exemplary embodiment of the present invention, the method further includes turning off a switching element, which turns on/off the first alternating current voltage, when the arc noise detection voltage is detected.

In one exemplary embodiment of the present invention, the removing a low frequency component from the sine wave output from the light source removes all frequency components except the arc noise signal.

In one exemplary embodiment of the present invention, the method further includes; outputting a sensing signal by detecting a current output from the light source, generating a feedback signal corresponding to the sensing signal, converting a reference voltage based on the feedback signal, and controlling the current flowing through the light source to have a predetermined value using the converted reference voltage.

According to another exemplary embodiment of the present invention, a light source assembly includes; a light source part having at least two terminals, and an inverter part including; a switching part which converts an externally supplied DC voltage into a first AC voltage, a transforming part which boosts the first AC voltage applied from the switching part into a second AC voltage having a higher voltage than the first AC voltage, and an arc noise detecting part which adds arc noise generated from the at least two terminals of the light source part to detect an arc noise voltage.

In an exemplary embodiment of the present invention, the transforming part may include; a first transformer connected to a first terminal of each lamp of the light source part, and a second transformer connected to a second terminal of each lamp of the light source part.

In an exemplary embodiment of the present invention, the arc noise detecting part may include; a low frequency removing capacitor connected to the first transformer which removes a low frequency from a sine wave having arc noise and the low frequency to isolate the arc noise, a first diode which rectifies a negative component of the arc noise, a second diode which rectifies a positive component of the arc noise, a first capacitor which charges a voltage rectified by the first diode and a second capacitor which charges a voltage rectified by the second diode.

In an exemplary embodiment of the present invention, the arc noise detecting part may further include; a first current sensing resistor connected between the first transformer and a ground terminal, and a second current sensing resistor connected between the ground terminal and the second transformer.

In an exemplary embodiment of the present invention, the arc noise detecting part may output an arc noise detection voltage substantially equal to the first voltage charged in the first capacitor and the second voltage charged in the second capacitor added to each other.

In an exemplary embodiment of the present invention, the arc noise detecting part may include an arc noise detecting circuit which detects arc noise from the at least two terminals of the light source part to generate a detection voltage.

In an exemplary embodiment of the present invention, the light source part may include at least two cold cathode florescent lamps ("CCFLs"), and each of the CCFLs may include at least one balance capacitor which controls an amplitude of the second AC voltage applied from the inverter part.

According to still another exemplary embodiment of the present invention, an LCD apparatus includes; a display panel part which applies a grayscale voltage provided from a data driving part and a common voltage provided from a voltage conversion part to a liquid crystal layer disposed between two substrates, and a light source assembly including; a light source part, and an inverter part including an arc noise detecting part which detects arc noise generated from the light source part.

In an exemplary embodiment of the present invention, the inverter part may further include; a switching part which converts an externally applied direct current voltage into a first alternating current voltage, and a transformer part which boosts the first alternating current voltage applied from the switching part into a second alternating current voltage having a voltage higher than the first alternating current voltage, the transformer part including; a first transformer connected to a first terminal of the light source part, and a second transformer connected to a second terminal of the light source part, wherein the first transformer and the second transformer are serially connected to each other.

In an exemplary embodiment of the present invention, the arc noise detecting part may include; a low frequency removing capacitor connected to the first transformer which removes a low frequency component from a sine wave having the low frequency component and the arc noise to isolate the arc noise, a first diode which rectifies a negative component of the arc noise, a second diode which rectifies a positive component of the arc noise, a first capacitor which charges a voltage rectified through the first diode, and a second capacitor which charges a voltage rectified through the second diode.

In an exemplary embodiment of the present invention, the arc noise detecting part may further include; a first current sensing resistor connected between the first transformer and a ground terminal, and a second current sensing resistor connected between the ground terminal and the second transformer.

In an exemplary embodiment of the present invention, the arc noise detecting part may output an arc noise detection voltage by adding a first voltage charged in the first capacitor and a second voltage charged in the second capacitor.

In an exemplary embodiment of the present invention, the arc noise detecting part may include an arc noise detecting circuit, which detects arc noise from each of the first and second terminals of the light source part, respectively, to generate a detection voltage.

According to a method of driving a light source, a light source assembly for performing the method, and an LCD apparatus having the light source assembly, positive and negative components of arc noise are charged in the capacitors serially connected to each other, so that a voltage two times higher than that detected through a conventional method may be detected when small arc noise is generated, so that a rate of detection may be increased.

Moreover, in order to detect a voltage output from both terminals of the light source part, separate circuits are configured as a single circuit, so that manufacturing costs of the light source assembly or an LCD apparatus may be decreased and a circuit employed in the light source assembly or an LCD apparatus may be simplified.

BRIEF DESCRIPTION OF THE DRAWINGS

The above and other aspects, features and advantages of the present invention will become more apparent by describing in detailed example embodiments thereof with reference to the accompanying drawings, in which.

DETAILED DESCRIPTION OF THE INVENTION

Figure 1:
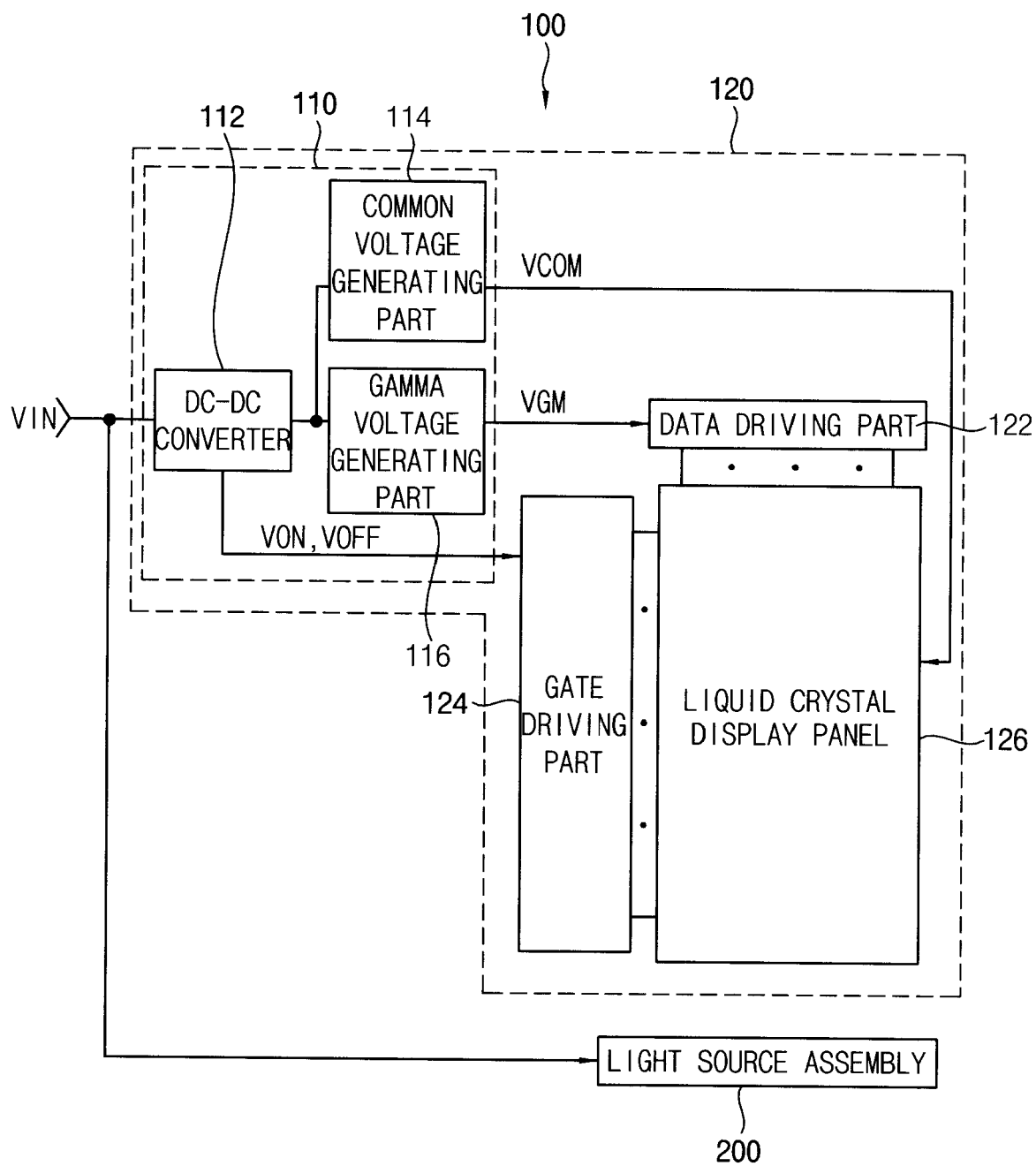
FIG. 1 is a block diagram illustrating an exemplary embodiment of a liquid crystal display ("LCD") apparatus according to the present invention.

The invention now will be described more fully hereinafter with reference to the accompanying drawings, in which embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

It will be understood that when an element is referred to as being "on," "connected to" or "coupled to" another element, it can be directly on, connected or coupled to the other element or intervening elements may be present. In contrast, when an element is referred to as being "directly on," "directly connected to" or "directly coupled to" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
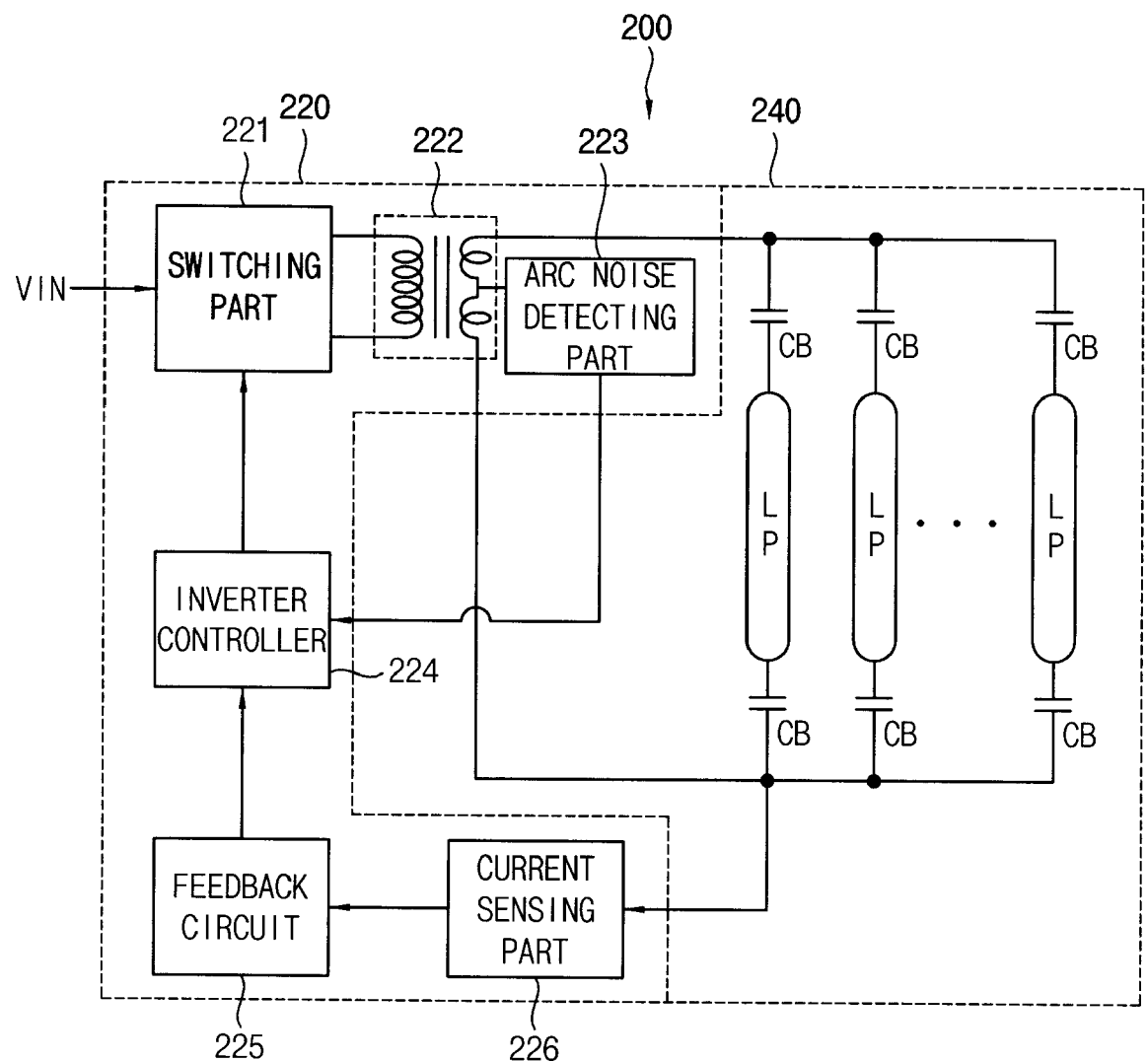
FIG. 2 is a block diagram illustrating an exemplary embodiment of the light source assembly of FIG. 1.
Figure 3:
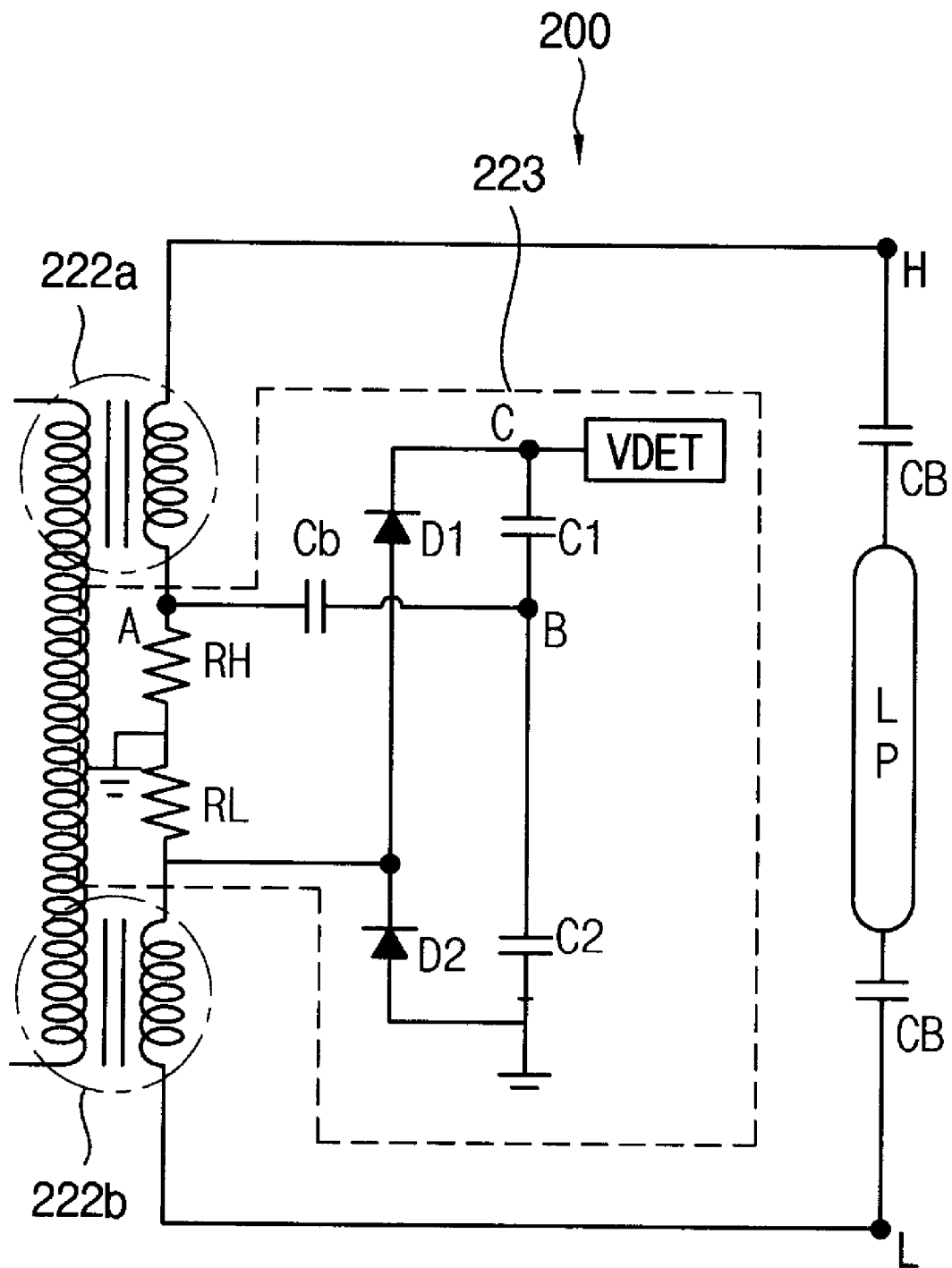
FIG. 3 is a circuit diagram illustrating an exemplary embodiment of an arc noise detecting part included in the light source assembly according to the present invention.

FIG. 1 is a block diagram illustrating an exemplary embodiment of a liquid crystal display ("LCD") apparatus 100 according to the present invention. FIG. 2 is a block diagram illustrating an exemplary embodiment of the light source assembly of FIG. 1. FIG. 3 is a circuit diagram illustrating an exemplary embodiment of an arc noise detecting part of the light source assembly according to the present invention.

Referring to FIG. 1, an LCD apparatus 100 includes a display panel part 120 and a light source assembly 200.

The display panel part 120 includes a voltage conversion part 110, a data driving part 122, a gate driving part 124 and a liquid crystal display panel 126.

The voltage conversion part 110 includes a direct current to direct current (DC-DC) converter 112, a common voltage generating part 114 and a gamma voltage generating part 116. The DC-DC converter 112 converts a voltage level of a DC voltage inputted from an external device to provide the converted DC voltage to the common voltage generating part 114 and a gamma voltage generating part 116. In one exemplary embodiment, the DC-DC converter 112 steps down the externally supplied voltage to a lower voltage to be applied to the common voltage generating part 114 and a gamma voltage generating part 116. The common voltage generating part 114 generates a common voltage VCOM, using the DC voltage provided from the DC-DC converter 112 and provides the common voltage VCOM to the display panel part 120. The gamma voltage generating part 116 generates a gamma voltage VGM, using the DC voltage provided from the DC-DC converter 112, and provides the gamma voltage VGM to the display panel part 120.

The data driving part 122 provides a grayscale display voltage corresponding to a data grayscale, using the gamma voltage VGM provided from the voltage conversion part 110. The gate driving part 124 provides a gate on voltage VON and a gate off voltage VOFF provided from the voltage conversion part 110 to the display panel 126.

In the present exemplary embodiment, the display panel 126 displays image data when a grayscale display voltage provided from the data driving part 124 and the common voltage VCOM provided from the voltage conversion part 110 are applied to a liquid crystal layer (not shown) interposed between an upper substrate (not shown) and a lower substrate (not shown) of the display panel 126, in response to the gate on/off voltage VON/VOFF provided from the gate driving part 124.

Referring to FIGS. 1 to 3, the light source assembly 200 includes an inverter part 220 and a light source part 240.

The inverter part 220 converts the externally supplied direct current ("DC") voltage VIN into an first alternating current ("AC") voltage to drive the light assembly 200. The inverter part 220 provides a high voltage required to initially turn on the lamp, based on characteristics required to turn on the lamp. After the lamp is turned on, the inverter part 220 may control the current of the lamp to maintain constant the brightness of the lamp. In one exemplary embodiment, the inverter part 220 controls the current of the lamp to maintain a constant brightness by applying a lower voltage than the high voltage required to initially turn on the lamp.

Exemplary embodiments include configurations wherein the inverter part 220 is mounted on a separate printed circuit board ("PCB") (not shown), or wherein the inverter part 220 is mounted on a gate PCB or a data PCB. For simplicity, in the present exemplary embodiment the inverter part 220 will be described as being mounted on the separate PCB.

The inverter part 220 includes a switching part 221, a transforming part 222, an arc noise detecting part 223, an inverter controller 224, a current sensing part 226 and a feedback circuit 225. As shown in detail in FIG. 3, the transforming part 222 is connected between a first terminal H and a second terminal L of a light source (for example, a lamp LP). The switching part 221 is connected to the transforming part 222 and the inverter controller 223, while the feedback circuit 225 is sequentially connected to the switching part 221 through the inverter controller 223. The current sensing part 226 is connected between the second terminal L of the light source and the feedback circuit 225.

That is, the switching part 221 switches a switching element according to a switching control signal provided from the inverter controller 224 to convert the DC voltage provided from the external device into the first AC voltage. Accordingly, the first AC voltage converted from the DC voltage from the external device in the switching part 221 may be an second AC voltage having a high voltage, so that the second AC voltage having a high voltage may be provided to light sources.

Also, the current sensing part 226 is connected to the light sources and may detect a current outputted from each light source to output a sensing signal, and the feedback circuit 225 may generate a feedback signal corresponding to the sensing signal. The inverter controller 224 controls the switching part 221 based on the feedback signal and the transforming part 222 maintain a substantially constant current flowing into each of the light sources.

The inverter controller 224 pulse-width modulates a reference voltage and a triangular wave pulse to generate a switch control signal for controlling the switching part 221. The switch control signal is provided to the switching part 221. Here, the inverter controller 224 converts the reference voltage according to the feedback signal provided from the feedback circuit 221, so that the inverter controller 224 may modulate the pulse width of the switch control signal. As a result, by simultaneously driving a plurality of lamps using a single inverter part 220, manufacturing costs may be reduced.

The light sources, e.g., lamps LP, of the light source part 240 may be disposed in a direct-type or an edge-type configuration, to provide light to the display panel 126. An exemplary embodiment of the edge-type configuration is a configuration in which a light guide plate (not shown) is disposed below the display panel 126 and the lamps are disposed at one side or more sides of the light guide plate (not shown) which guides the light to be provided to the display panel 126. However, an alternative configuration, e.g., the direct-type configuration, has been developed as LCD apparatuses have increased in size. An exemplary embodiment of the direct-type configuration is a configuration in which a plurality of lamps is disposed below diffusion sheets disposed below the display panel 126, to directly provide light to a whole surface of the display panel 126, e.g., there is no light guide plate, or the light guide plate does not redirect light towards the display panel 126. Since the direct-type configuration has high light efficiency compared to the edge-type configuration, the direct-type configuration is usually used in large-size LCD apparatuses.

The light source part 240 may include at least one cold cathode fluorescent lamp ("CCFL") or at least one external electrode fluorescent lamp ("EEFL"). The CCFL emits electrons from one of at least two electrodes therein due to the high voltage provided from the transforming part 222 to the electrodes of the CCFL, and the electrons collide with an inert gas inside a glass tube, so that the energy is generated as the inert gas is excited. While exciting the inert gas, such energy emits ultraviolet light and the ultraviolet light collides with a luminous fluorescent substance spread on the inside wall of the glass tube to emit visible light. In one exemplary embodiment, the inert gas may be mercury. Since an second AC voltage may be applied to the electrodes of the CCFL, the electrode emitting electrons may vary according to the phase of the second AC voltage.

In one exemplary embodiment, the light source part 240 includes a plurality of light sources LP serially connected to each other. In conventional light source assemblies, an individual transforming part is required for each light source in order to control levels of voltage applied to each light source, thereby increasing manufacturing costs. The structure of the exemplary embodiments proposed to solve such a problem and reduce the costs is a cap balance structure using balance capacitors CB, as will be discussed in detail below.

When the light source part 240 includes at least one CCFL, the one CCFL may have at least one balance capacitor CB at an end or both ends of the CCFL, to control the amplitude of voltage provided from the transforming part 222. That is, the balance capacitors CB prevent a sudden increase of a discharging current when lamps LP are individually driven. When a plurality of lamps LP connected in parallel is driven by one power supply device, the balance capacitors CB may uniformly distribute the current to equally maintain the luminance of each lamp. According to one exemplary embodiment of the present invention, the light source part 240 using the CCFL (hereinafter, referred to as a light source) will be explained in further detail.

Exemplary embodiments include configurations wherein the balance capacitors CB may be connected to only the first terminal, only the second terminal, or to both terminals of the lamps LP. The number of balance capacitors CB corresponds to the number of the lamps LP. In one exemplary embodiment wherein the LCD panel is large, the lamps LP may have both terminals thereof connected to the balance capacitors CB. Accordingly, the lamps LP are connected in parallel, and thus the lamps LP connected in parallel require at least one transformer. Connecting the lamps LP in parallel may reduce the costs by allowing the lamps LP to be turned on using fewer transformers than in an alternative embodiment wherein the lamps are serially connected to each other.

Also, the balance capacitors CB may uniformly hold a current balance by limiting the current supplied from the second side of the transforming part 222 and match an impedance of outputting ends of the lamp and the inverter.

As shown in detail in FIG. 3, the transforming part 222 includes a first transformer 222a connected to the first terminal (the high voltage terminal: H) and a second transformer 222b connected to the second terminal (the low voltage terminal: L). In the present exemplary embodiment, the first transformer 222a and the second transformer 222b are serially connected together.

A first end of a second side coil of the first transformer 222a is connected to the first terminal H of the light source, and a second end of the second side coil of the first transformer 222a is connected to the arc noise detecting part 223. A first end of a second side coil of the second transformer 222b is connected to the arc noise detecting part 223, and a second end of the second side coil of the second transformer 222b is connected to the second terminal L.

The first AC voltage converted from the switching part 221 is inputted to a first side coil of the transforming part 222 to be boosted to a high voltage having a predetermined amplitude based on a winding ratio of the first side coil to the second side coil. The boosted voltage is applied to the light source part 240 to turn on the light sources.

Accordingly, an arc discharge may be generated from the first transformer 222a or second transformer 222b to the first terminal H, e.g., due to a bad connection between the first end of the second side coil of the first transformer 222a and the first terminal H of the light source and a bad connection between the second end of the second side coil of the first transformer 222b and the second terminal L of the light source.

In such an arc discharge scenario, the voltage of the first terminal H is not constant and includes many high frequency components. The voltage of the first terminal H includes the noise component generated by a surrounding circuit or devices, etc. In such a scenario the frequency of the noise component generated by a surrounding circuit or device may be lower than the frequency of the high frequency component generated by the arc noise. In one exemplary embodiment, the high frequency component according to the arc noise is higher than about 3 MHz, while the noise component generated by a surrounding circuit or device is lower than about 1 MHz. Accordingly, the high frequency component according to the arc noise is higher than the low frequency component due to the surrounding circuitry and devices.

The arc noise detecting part 223 is connected to the transforming part 222 to detect arc noise generated in the second coil of the transforming part 222.

The arc noise detecting part 223 includes a low frequency removing capacitor Cb, a first diode D1, a second diode D2, a first capacitor C1 and a second capacitor C2.

The low frequency removing capacitor Cb is connected to a second end of the second coil of the first transformer 222a to remove a low frequency in a signal, e.g., a sine wave, having the arc noise so that the arc noise remains while the low frequency is removed. That is, as described above, the low frequency removing capacitor Cb leaves a high frequency component including the remaining arc noise and removes only the low frequency component. The first diode D1 and the first capacitor C1 rectify a negative component of the arc noise and charge the rectified voltage. The second diode D2 and the second capacitor C2 rectify a positive component of the arc noise and charge the rectified voltage. In the present exemplary embodiment, the first capacitor C1 and the second capacitor C2 are serially connected to each other.

Accordingly, the arc noise detecting part 223 may detect an arc noise detection voltage VDET. The arc noise detection voltage is equal to a first voltage Vc1 charged in the first capacitor C1 added to a second voltage Vc2 charged in the second capacitor C2. Because the arc noise detecting part 223 uses at least two capacitors, a voltage two times higher than a voltage detected by a conventional arc noise detecting circuit is detected, so that the accuracy of detection may be improved when the arc noise would otherwise be too small to detect. For instance, because VDET is equal to the first voltage Vc1 combined with the second voltage Vc2, each individual voltage may be below that which would be detected by a conventional arc noise detection circuit, but the combined voltage Vc1+Vc2 may be large enough to be detected.

In one exemplary embodiment, the arc noise detecting part 223 may further include current sensing resistors RH and RL.

In order to detect the arc noise from the first terminal H and the second terminal L, in one exemplary embodiment the arc noise detecting part 223 may include one arc noise detecting circuit, but alternative exemplary embodiments may include a plurality of circuits, e.g., an individual circuit for each of the terminals of the light source.

Figure 4:
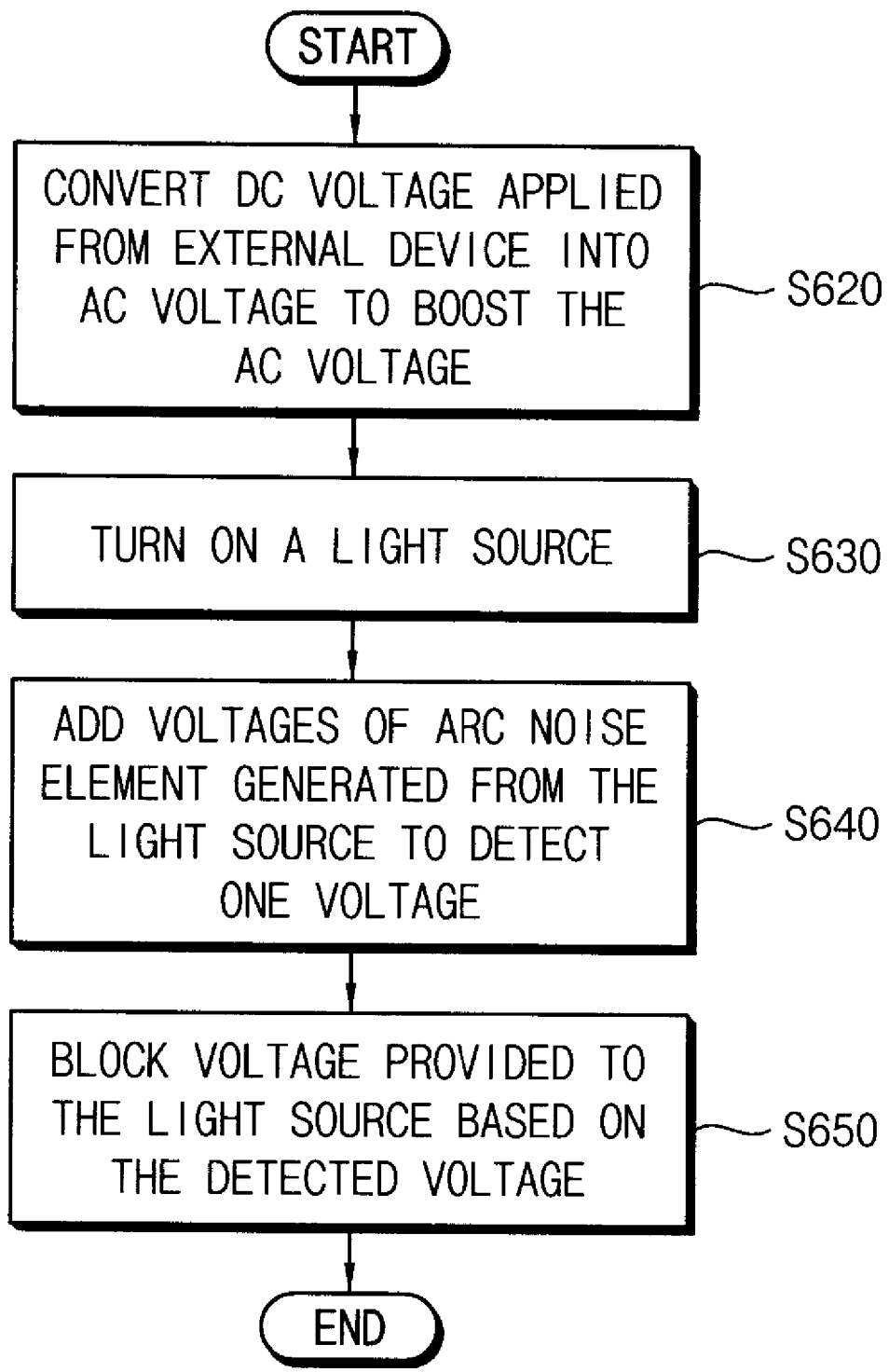
FIG. 4 is a flowchart illustrating an exemplary embodiment of a method of driving the light source according to the present invention.

FIG. 4 is a flowchart illustrating an exemplary embodiment of a method of driving the light source according to the present invention.

Referring to FIGS. 2 to 4, the switching part 221 converts the DC voltage VIN applied from the external device into the first AC voltage and the transforming part 222 boosts the converted first AC voltage to a high voltage based on a winding ratio of both sides of the transforming part 222 (step S620).

Then, the boosted high voltage turns on the light source (step S630).

The sine wave outputted from both terminals of the light source, namely the high voltage terminal H and the low voltage terminal L, might include an arc noise component. The low frequency may be removed from the sine wave, thereby leaving the arc noise component (if present).

The arc noise component is half-wave rectified using the first diode D1 and the first capacitor C1, the first capacitor C1 is charged with the first voltage of the negative component of the arc noise. Also, the arc noise component is half-wave rectified using the second diode D2 and the second capacitor C2, the second capacitor C2 is charged with the second voltage of the positive component of the arc noise.

The voltages charged in the first and second capacitors C1 and C2 are added together to be detected as a single voltage (step S640).

If an arc noise component is detected based on the detected voltage, the inverter controller 224 shuts off the first AC voltage provided from the switching part 221 to the light source (step S640).

Figure 5A:
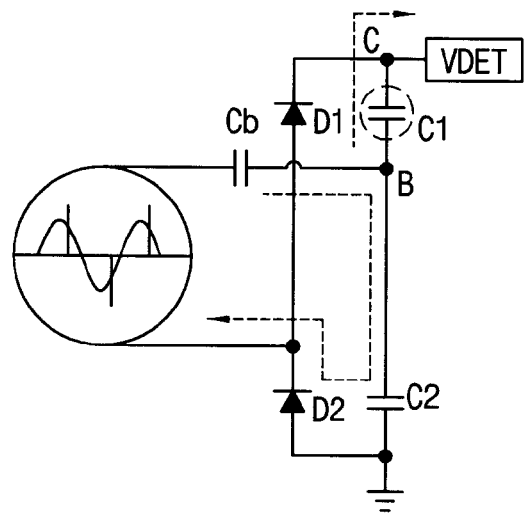
FIG. 5A is a circuit diagram illustrating the operation of the arc noise detecting circuit in accordance with a positive component of the arc noise.
Figure 5B:
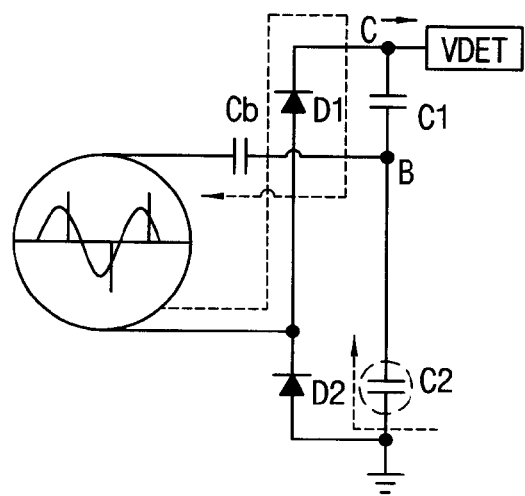
FIG. 5B is a circuit diagram illustrating the operation of the arc noise detecting circuit in accordance with a negative component of the arc noise.
Figure 6A:
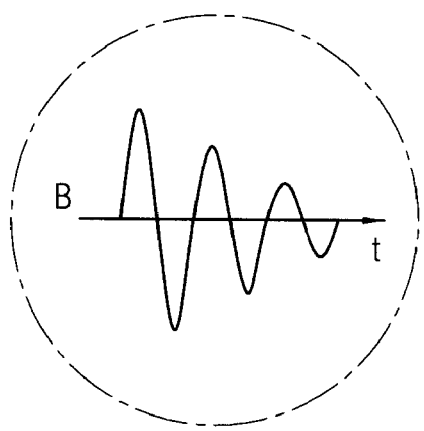
FIG. 6A is an enlarged waveform diagram illustrating the arc noise in a sine wave of FIGS. 5A and 5B.
Figure 6B:
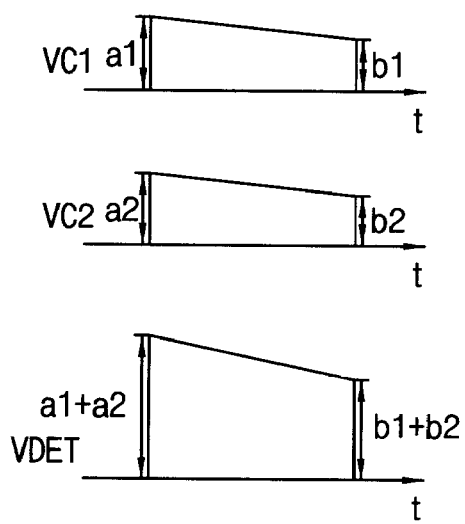
FIG. 6B is waveform diagrams illustrating voltages charged in a capacitor of FIGS. 5A and 5B.

FIG. 5A is a circuit diagram illustrating the operation of the arc noise detecting circuit in accordance with a positive component of the arc noise. FIG. 5B is a circuit diagram illustrating the operation of the arc noise detecting circuit in accordance with a negative component of the arc noise. FIG. 6A is an enlarged waveform diagram illustrating the arc noise included in a sine waveform of FIGS. 5A and 5B. FIG. 6B is waveform diagrams illustrating voltages charged in a capacitor of FIGS. 5A and 5B.

Referring to FIGS. 3 to 6B, an exemplary embodiment of the operation of an exemplary embodiment of the light source assembly 200 according to the present invention wherein the light source assembly 200 detects the arc noise voltage will be explained in more detail.

The present exemplary embodiment describes the operation for detecting the arc noise generated from the first terminal H and the second terminal L of the light source.

In a node A of the arc noise detecting part 223 of FIG. 3, the sine wave comprising the arc noise having a high frequency component is passed through the current sensing resistor RH. Also, at a node B, a low frequency component of the sine wave is removed, using a low frequency removing capacitor (or, a filter), so that only the arc noise remains.

When the arc noise is in the positive area of the sine wave, one half-wave rectification circuit includes the second diode D2, the first capacitor C1 and the second capacitor C2 to rectify the arc noise and when the arc noise is in the negative area of the sine wave, another half-wave rectification circuit includes the first diode D1, the first capacitor C1 and the second capacitor C2 to rectify the arc noise. Accordingly, as shown in FIG. 5A, when the arc noise is in the positive area, the arc noise is half-wave rectified by the second diode D2. The voltage generated through the second diode D2 is charged in the second capacitor C2. Also, as shown in FIG. 5B, when the arc noise is in the negative area, the arc noise is half-wave rectified by the first diode D1. The voltage generated through the first diode D1 is charged in the first capacitor C1.

Accordingly, as shown in FIG. 6B, since the first and second capacitors C1 and C2 are serially connected, an amplitude a1 of the voltage charged in the first capacitor C1 is added to an amplitude a2 of the voltage charged in the second capacitor C2, so that an arc noise detection voltage VDET having a final amplitude a1+a2 is detected.

As a result, the arc noise detection voltage VDET is provided to the inverter controller 224, the inverter controller 224 recognizes the generation of the arc noise to turn the switching part 221 off. In one exemplary embodiment, the inverter controller 224 compares the arc noise detection voltage VDET to a comparison reference voltage and if the arc noise detection voltage VDET is greater than the comparison reference voltage the inverter controller turns the switching part 221 off.

Accordingly, one arc noise detecting circuit detecting the arc noise connected to both the first terminal H and the second terminal L of the light source may reduce detection failures due to the arc noise voltage being too small, and may also prevent the generation of damage to the inverter part 220 or the light source assembly 200, compared to a conventional method in which two or more arc noise detecting circuits are connected to each of the first terminal H and the second terminal L of the light source.

According to exemplary embodiments of the present invention, as described herein, positive and negative components of arc noise are charged in serially connected capacitors, respectively, so that an arc noise detection voltage having a voltage at least two times higher than that detected through a conventional method may be detected. In a case where small arc noise is generated, the rate of detection and the accuracy of the arc noise detection may be increased. Accordingly, the generation of damage to the inverting part 222 and the surrounding components may be prevented.

Also, voltages output from a first terminal and a second terminal of a light source (e.g., a lamp LP) do not need to be detected by separate circuits of the first terminal and the second terminal, but only through an integrated circuit for both terminals. Therefore, manufacturing costs may be reduced because the circuit has a simple structure.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures.

Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of driving a light source, the method comprising:
    converting an externally supplied direct current voltage into a first alternating current voltage;
    boosting the first alternating current voltage to a second alternating current voltage having a higher voltage than the first alternating current voltage;
    turning on the light source using the second alternating current voltage;
    detecting an arc noise detection voltage by adding arc noise generated from a high voltage terminal of the light source to arc noise generated from a low voltage terminal of the light source; and
    blocking the second alternating current voltage from being provided to the light source based on the detected arc noise detection voltage,
    wherein boosting the first alternating current voltage to the second alternating current voltage comprises:
        connecting a first transformer to the high voltage terminal of each lamp of the light source; and
        connecting a second transformer to the low voltage terminal of each lamp of the light source.

2. The method of claim 1, wherein detecting the arc noise detection voltage further comprises:
    removing a low frequency component from a sine wave output from the light source to isolate the arc noise from the sine wave;
    half-wave rectifying the arc noise to block a positive component of the arc noise, and charging a first voltage of a negative component of the arc noise;
    half-wave rectifying the arc noise to block the negative component of the arc noise, and charging a second voltage of a positive component of the arc noise; and
    detecting an arc noise detection voltage by adding the first voltage and the second voltage.

3. The method of claim 2, further comprising:
    turning off a switching element, which turns on/off the first alternating current voltage, when the arc noise detection voltage is detected.

4. The method of claim 2, wherein the removing a low frequency component from the sine wave output from the light source removes all frequency components except the arc noise signal.

5. The method of claim 1, further comprising:
    outputting a sensing signal by detecting a current output from the light source;
    generating a feedback signal corresponding to the sensing signal;
    converting a reference voltage based on the feedback signal; and
    controlling the current flowing through the light source to have a predetermined value using the converted reference voltage.

6. A light source assembly comprising:
a light source part having at least two terminals; and
an inverter part comprising:
- a switching part which converts an externally supplied direct current voltage into a first alternating current voltage;
- a transforming part which boosts the first alternating current voltage applied from the switching part into a second alternating current voltage having a higher voltage than the first alternating current voltage; and
- an arc noise detecting part which adds arc noise generated from the at least two terminals of the light source part to each other to detect an arc noise voltage, wherein the transforming part comprises:
a first transformer connected to a first terminal of each lamp of the light source part; and
a second transformer connected to a second terminal of each lamp of the light source part.

7. The light source assembly of claim 6, wherein the arc noise detecting part comprising:
- a low frequency removing capacitor, connected to the first transformer, which removes a low frequency from a sine wave having arc noise and the low frequency to isolate the arc noise;
- a first diode which rectifies a negative component of the arc noise;
- a second diode which rectifies a positive component of the arc noise;
- a first capacitor which charges a voltage rectified by the first diode; and
- a second capacitor which charges a voltage rectified by the second diode.

8. The light source assembly of claim 6, wherein the arc noise detecting part further comprises:
- a first current sensing resistor connected between the first transformer and a ground terminal; and
- a second current sensing resistor connected between the ground terminal and the second transformer.

9. The light source assembly of claim 6, wherein the arc noise detecting part outputs an arc noise detection voltage substantially equal to the first voltage charged in the first capacitor and the second voltage charged in the second capacitor added to each other.

10. The light source assembly of claim 6, wherein the arc noise detecting part comprises an arc noise detecting circuit which detects arc noise from the at least two terminals of the light source part to generate a detection voltage.

11. The light source assembly of claim 6, wherein the light source part comprises at least two cold cathode florescent lamps, and each of the cold cathode florescent lamps comprises at least one balance capacitor which controls an amplitude of the second alternating current voltage applied from the inverter part.

12. A liquid crystal display apparatus comprising:
- a display panel part which applies a grayscale voltage provided from a data driving part and a common voltage provided from a voltage conversion part to a liquid crystal layer disposed between two substrates; and
- a light source assembly comprising:
  a light source part having at least two terminals;
  an inverter part comprising an arc noise detecting part which adds first and second arc noises generated from the at least two terminals of the light source part to each other, to detect a third arc noise;
  a first transformer connected to a first terminal of the light source part; and
  a second transformer connected to a second terminal of the light source part.

13. The liquid crystal display apparatus of claim 12, wherein the inverter part further comprises:
- a switching part which converts an externally applied direct current voltage into a first alternating current voltage; and
- a transformer part which boosts the first alternating current voltage applied from the switching part into a second alternating current voltage having a voltage higher than the first alternating current voltage, the transformer part comprising:
  the first transformer connected to the first terminal of the light source part; and
  the second transformer connected to the second terminal of the light source part,
  wherein the first transformer and the second transformer are serially connected to each other.

14. The liquid crystal display apparatus of claim 13, wherein the arc noise detecting part comprises:
- a low frequency removing capacitor, connected to the first transformer, which removes a low frequency component from a sine wave having the low frequency component and the arc noise to isolate the arc noise;
- a first diode which rectifies a negative component of the arc noise;
- a second diode which rectifies a positive component of the arc noise;
- a first capacitor which charges a voltage rectified through the first diode; and
- a second capacitor which charges a voltage rectified through the second diode.

15. The liquid crystal display apparatus of claim 14, wherein the arc noise detecting part further comprises:
- a first current sensing resistor connected between the first transformer and a ground terminal; and
- a second current sensing resistor connected between the ground terminal and the second transformer.

16. The liquid crystal display apparatus of claim 14, wherein the arc noise detecting part outputs an arc noise detection voltage by adding a first voltage charged in the first capacitor and a second voltage charged in the second capacitor.

17. The liquid crystal display apparatus of claim 14, wherein the arc noise detecting part comprises an arc noise detecting circuit which detects arc noise from each of the first and second terminals of the light source part, respectively, to generate a detection voltage.

* * * * *